(12) United States Patent
Nye (10) Patent No.: US 10,189,584 B2
(45) Date of Patent: Jan. 29, 2019

(54) CONTROLLING A PROPELLANT DISTRIBUTION IN A SPACECRAFT PROPELLANT TANK

(71) Applicant: AIRBUS DEFENCE AND SPACE LIMITED, Stevenage, Hertfordshire (GB)

(72) Inventor: Benjamin John Sapwell Nye, Stevenage (GB)

(73) Assignee: AIRBUS DEFENCE AND SPACE LIMITED, Stevenage, Hertfordshire (GB)

( * ) Notice: Subject to any disclaimer, the term of this patent is extended or adjusted under 35 U.S.C. 154(b) by 567 days.

(21) Appl. No.: 14/770,400

(22) PCT Filed: Feb. 26, 2014

(86) PCT No.: PCT/EP2014/053745
§ 371 (c)(1),
(2) Date: Aug. 25, 2015

(87) PCT Pub. No.: WO2014/131802
PCT Pub. Date: Sep. 4, 2014

(65) Prior Publication Data
US 2016/0001897 A1    Jan. 7, 2016

(30) Foreign Application Priority Data

Feb. 26, 2013 (EP) .................................. 13275043

(51) Int. Cl.
*B64G 1/40* (2006.01)
*F02K 9/60* (2006.01)
*G01F 23/288* (2006.01)

(52) U.S. Cl.
CPC .............. *B64G 1/402* (2013.01); *F02K 9/605* (2013.01); *G01F 23/288* (2013.01); *F05D 2270/303* (2013.01)

(58) Field of Classification Search
CPC .... F17C 13/088; F17C 13/026; F17C 13/028; F17C 2250/0408; F17C 2250/0439;
(Continued)

(56) References Cited

U.S. PATENT DOCUMENTS 5,209,115 A * 5/1993 Bond ..................... B64G 1/402
219/438
2007/0193282 A1* 8/2007 Grayson ................... F17C 3/10
62/45.1
(Continued)

FOREIGN PATENT DOCUMENTS

EP    2 103 863 A1    9/2009
JP    61-122512 A    6/1986

OTHER PUBLICATIONS

Ambrose, J. et al, "Modeling to Evaluate a Spacecraft Propellant Gauging System", Journal of Spacecraft and Rockets, American Institute of Aeronautics and Astronautics, Nov. 1, 2000, vol. 37, No. 6, pp. 833-835.
(Continued)

*Primary Examiner* — Gerald L Sung
*Assistant Examiner* — William Breazeal
(74) *Attorney, Agent, or Firm* — Fisherbroyles, LLP; Robert Kinberg (57) ABSTRACT

A system for controlling a distribution of propellant in a propellant tank assembly for a spacecraft comprises a body for containing the propellant, a plurality of thermal tomography elements, including a plurality of temperature-control elements and a plurality of temperature sensors, disposed around the body for detecting the distribution of the propel-
(Continued)

lant inside the body; and a tomography element control module arranged to control the plurality of temperature-control elements to redistribute the propellant inside the propellant tank body by heating and/or cooling the propellant. In an embodiment, the propellant tank body includes a propellant management device inside the body and the tomography elements are disposed in proximity to the propellant management device. Tomography data can be obtained from the plurality of tomography elements, and a distribution of propellant within the propellant tank body can be determined based on the obtained tomography data.

14 Claims, 6 Drawing Sheets

(58) Field of Classification Search
CPC ........ F17C 2250/032; F17C 2227/0304; F17C 2270/0194; F03H 1/0012; B64G 1/402
See application file for complete search history.

(56) References Cited

U.S. PATENT DOCUMENTS

2009/0234596 A1* 9/2009 Kawasaki ............. F17C 13/026
702/55
2013/0263573 A1* 10/2013 Jaeger ...................... F02K 9/42
60/200.1

OTHER PUBLICATIONS

Roberti, D. et al, "Ultrasonic Void Estimation System for Determination of Liquids in Microgravity Tanks", IEEE Transactions on Instrumentation and Measurement, IEEE Service Center, Dec. 1, 1988, pp. 642-647.
International Search Report and Written Opinion for International Patent Application No. PCT/EP2014/053745, dated May 26, 2014.

* cited by examiner

CONTROLLING A PROPELLANT DISTRIBUTION IN A SPACECRAFT PROPELLANT TANK

FIELD OF THE INVENTION

The present invention relates to controlling a propellant distribution in a spacecraft propellant tank. In particular, the present invention relates to controlling a distribution of propellant inside a propellant tank body using a plurality of thermal tomography elements disposed around the body.

BACKGROUND OF THE INVENTION

It is a recurring requirement for space missions to provide means by which propellant levels can be gauged and controlled throughout the operational lifetime of a spacecraft. Conventional methods for propellant gauging include a dead reckoning method, and a thermal propellant gauging technique (TPGT). In the dead reckoning method, the current propellant level is estimated by subtracting an estimated mass of propellant burnt during all thruster firings since the mission began, from the initial level of propellant. This method and becomes increasingly inaccurate towards the end-of-life due to accumulated errors. In the TPGT method, the thermal response of the propellant tank to heating is measured and compared to simulation results for different propellant levels. A combination of dead reckoning and TPGT can also be used to estimate the remaining propellant level. However, these methods do not always satisfy the requirement for gauging accuracy throughout the on-orbit lifetime, which is typically ±10% of remaining propellant.

The invention is made in this context.

SUMMARY OF THE INVENTION

According to the present invention there is provided a system for controlling a distribution of propellant in a propellant tank assembly for a spacecraft, the system comprising: a body for containing the propellant; a plurality of thermal tomography elements, including a plurality of temperature-control elements and a plurality of temperature sensors, disposed around the body for detecting the distribution of the propellant inside the body; and a tomography element control module arranged to control the plurality of temperature-control elements to redistribute the propellant inside the propellant tank body by heating and/or cooling the propellant.

The system can further comprise: a propellant outlet; and a propellant management device inside the body, arranged to supply the propellant to the propellant outlet.

The plurality of temperature sensors can be disposed in proximity to the propellant management device.

The plurality of temperature-control elements can include a plurality of coolers disposed in proximity to the propellant management device.

The plurality of temperature-control elements can include a plurality of heaters disposed away from the propellant management device.

The propellant management device can comprise one or more vanes.

The plurality of thermal tomography elements can be disposed on an exterior surface of the body.

The tomography element control module can be further arranged to control the plurality of thermal tomography elements to obtain tomography data, and the system can further comprise: a tomography data analysis module arranged to receive the obtained tomography data and to determine a distribution of the propellant inside the propellant tank based on the obtained tomography data.

In an embodiment, the propellant tank assembly, the tomography element control module and the tomography data analysis module are included onboard the same spacecraft.

In another embodiment, the propellant tank assembly and the tomography element control module are included onboard the same spacecraft, and the tomography data analysis module is a ground-based module arranged to receive the obtained tomography data from the spacecraft.

According to the present invention, there is also provided a method of controlling the distribution of propellant in a propellant tank assembly for a spacecraft, the propellant tank assembly comprising a body for containing the propellant and a plurality of thermal tomography elements, including a plurality of temperature-control elements and a plurality of temperature sensors, disposed around the body for detecting the distribution of the propellant inside the body, the method comprising: controlling the plurality of temperature-control elements to redistribute the propellant inside the propellant tank body by heating and/or cooling the propellant.

Prior to controlling the plurality of temperature-control elements to redistribute the propellant, the method can further comprise: obtaining tomography data from the plurality of thermal tomography elements; and determining a distribution of propellant inside the propellant tank based on the obtained tomography data.

The method can further comprise: determining an amount of the propellant remaining in the propellant tank based on the determined distribution and a known density of the propellant.

Controlling the plurality of temperature-control elements to redistribute the propellant can comprise: comparing the determined distribution to a desired distribution of propellant to identify one or more first regions within the propellant tank body having a higher concentration of propellant in the determined distribution than in the desired no distribution; and controlling the plurality of temperature-control elements to heat the identified one or more first regions, and/or wherein controlling the plurality of temperature-control elements to redistribute the propellant comprises: comparing the determined distribution to the desired distribution of propellant to identify one or more second regions within the propellant tank body having a lower concentration of propellant in the determined distribution than in the desired distribution; and controlling the plurality of temperature-control elements to cool the identified one or more second regions.

The method can further comprise: obtaining updated tomography data from the plurality of thermal tomography elements, after controlling the plurality of temperature-control elements to redistribute the propellant inside the propellant tank body; and determining an updated distribution of the propellant inside the propellant tank based on the obtained tomography data.

The determined updated distribution of the propellant can be compared to the desired distribution to determine whether the desired distribution has been achieved.

According to the present invention, there is also provided a spacecraft including the propellant tank assembly.

BRIEF DESCRIPTION OF THE DRAWINGS

Embodiments of the present invention will now be described, by way of example only, with reference to the accompanying drawings, in which.

DETAILED DESCRIPTION

Figure 1:
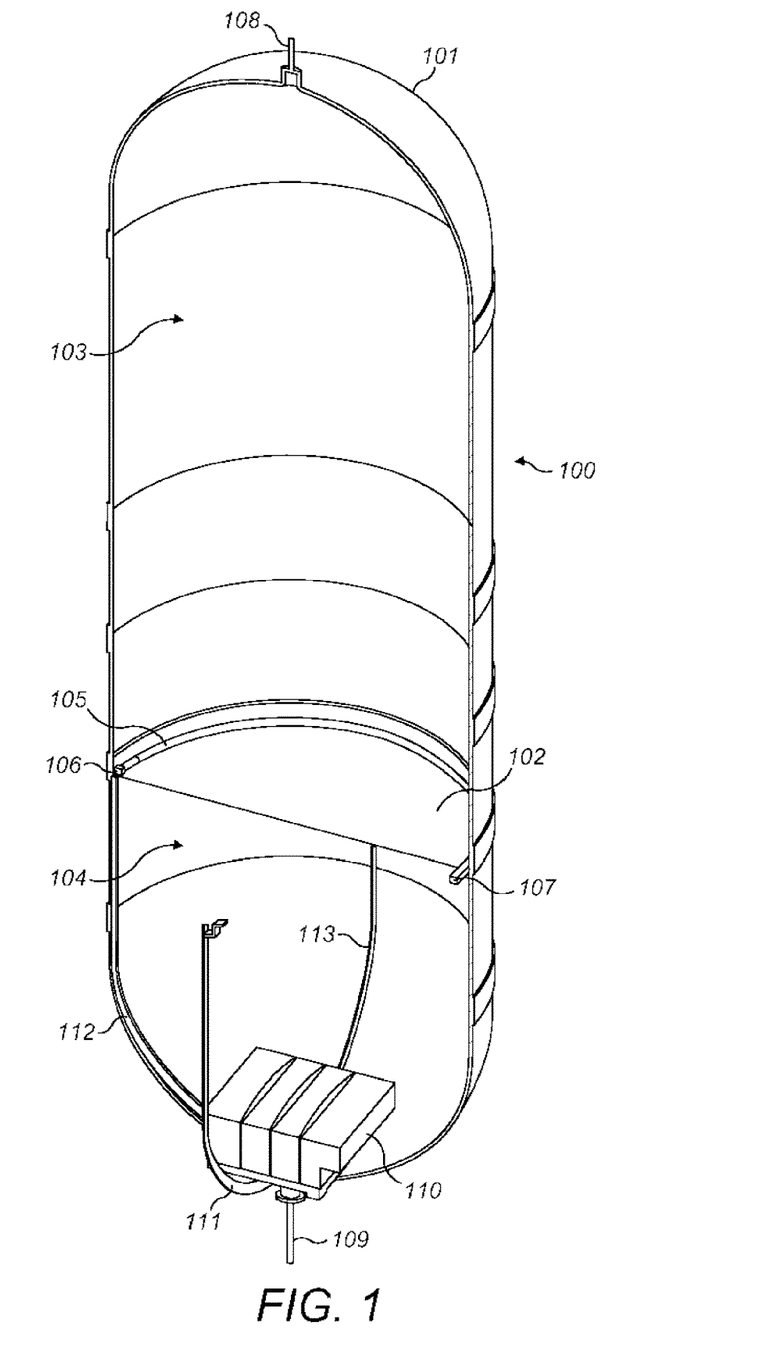
FIG. 1 illustrates a propellant tank assembly according to an embodiment of the present invention.

Referring now to FIG. 1, a propellant tank assembly according to an embodiment of the present invention is illustrated. The propellant tank assembly 100 comprises a body 101, which is a hollow container for containing propellant. The propellant tank assembly further comprises a membrane 102 disposed inside the body 101 to divide the body 101 into an upper compartment 103 and a lower compartment 104, and a communication tube 105 around the perimeter of the membrane 102. The communication tube 105 includes a first opening 106 into the upper compartment 103 and a second opening 107 into the lower compartment 104. The communication tube 105 allows communication of a fluid between the upper compartment 103 and the lower compartment 104.

The propellant tank assembly 100 further comprises a gas inlet 108 in fluid communication with the upper compartment 103, and a propellant outlet 109 in fluid communication with the lower compartment 104. The reservoir of pressure within the body 101 provides the driving force to expel propellant from the propellant outlet 109 whenever it is demanded by the downstream propulsion system.

In addition, as shown in FIG. 1 the propellant tank assembly 100 can further comprise one or more propellant management devices (PMDs) inside the body 101. In the present embodiment, the propellant tank assembly 100 includes a control PMD 110, which is a high-surface area structure in fluid communication with the propellant outlet 109, and further includes a communication PMD in the form of four vanes disposed on an interior surface of the body 101. In the present embodiment the four vanes are arranged at angles of 0, 90, 180 and 270 degrees around the central axis of the propellant tank 100, although only three of these vanes 111, 112, 113 are visible in the cut-away drawing illustrated in FIG. 1. The communication PMD 111, 112, 113 and control PMD no are arranged to draw propellant towards the propellant outlet 109 by capillary action, to provide gas-free propellant to the propellant outlet 109.

Although in the present embodiment a communication PMD including four vanes is provided, in other embodiments any number of vanes may be used, that is, one or more vanes. Furthermore, communication PMDs are not limited to vanes, and in other embodiments a different communication PMD can be provided instead of, or in addition to, one or more vanes. For example, instead of vanes a communication PMD can comprise one or more galleries each providing a covered flow path to the propellant outlet.

It will be understood that the propellant tank assembly 100 may be used in a microgravity environment, and that the terms 'upper' and 'lower' here merely refer to the propellant tank in the orientation shown in FIG. 1 and do not imply a particular orientation of the propellant tank assembly 100 during use.

Figure 2:
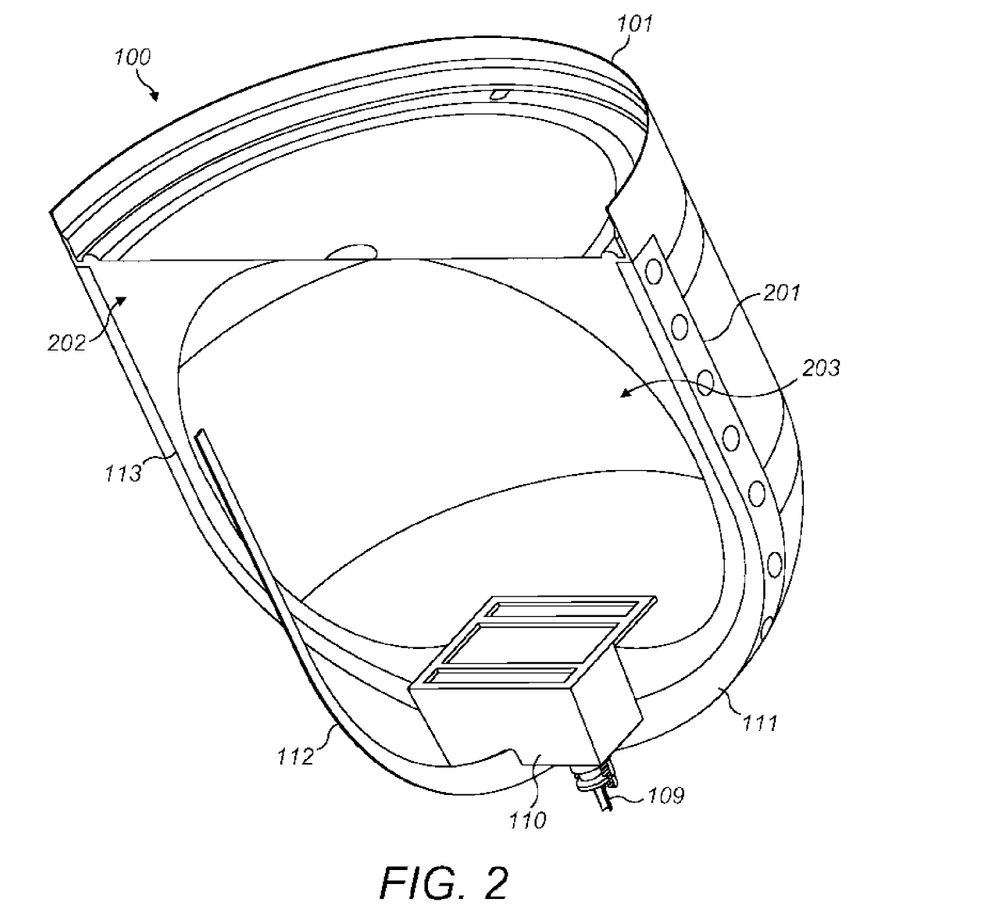
FIG. 2 illustrates a possible distribution of propellant in the lower compartment of the propellant tank assembly of FIG. 1, according to an embodiment of the present invention.

Referring now to FIG. 2, a possible distribution of propellant in the lower compartment of the propellant tank assembly of FIG. 1 is illustrated, according to an embodiment of the present invention. As shown in FIG. 2, the propellant tank assembly 100 further comprises an array of thermal tomography elements 201 disposed around the body 101, which can be used to determine the distribution of propellant 202 in the propellant tank. In the example of FIG. 2, the liquid propellant 202 is situated toward the sides of the lower compartment, and surrounds a bubble of pressurant gas 203. This is a propellant distribution that would be expected in a microgravity environment, in which the distribution of liquid is largely governed by surface tension forces. As the propellant 202 is consumed by the spacecraft, the volume of propellant 202 remaining in the propellant tank assembly 100 will decrease and the volume of the pressurant gas bubble 203 will increase.

The thermal tomography elements 201 can be used to collect tomography data which can be analysed to determine the distribution of propellant 202 within the propellant tank assembly 100. The thermal tomography elements 201 include a plurality of emitters and a plurality of receivers, which enable the internal distribution of liquid to be determined from the variation in attenuation experienced by waves travelling along different paths through the propellant tank body 101, between different emitters and receivers.

By enabling the distribution of propellant in the propellant tank 100 to be determined, embodiments of the present invention can provide an improved method of determining the remaining propellant levels. Being able to accurately determine the amount of propellant remaining can enable the mission duration to be extended.

In the present embodiment a thermal tomography method is used, and the plurality of tomography elements 201 include a plurality of heaters and a plurality of temperature sensors. The heaters can, for example, be resistive heating elements or peltier heaters. The temperature sensors can, for example, be thermistors or thermocouples. Other types of heaters and temperature sensors could be used.

An additional benefit of using thermal tomography is that the heaters in the array of tomography elements can be controlled to apply thermal gradients to influence the distribution of propellant within a tank, for example to move propellant towards collection features in the propellant tank body 101 such as the control PMD 110 and guide vanes 111, 112, 113. Controlling the propellant in this way can increase the amount of propellant that is recovered from the tank for end-of-life operation.

In the present embodiment the thermal tomography elements 201 are arranged in a regular array of strips, only one of which is visible in FIG. 2. Each strip 201 includes a plurality of elements attached to an exterior surface of the body. However, the invention is not limited to a tomography array in which the elements are arranged in strips. In general any geometry can be used for the array of thermal tomography elements, for example in any direction the elements may be regularly or irregularly spaced. Also, in other embodiments the plurality of thermal tomography elements could be disposed around the body 101 on an interior surface of the body 101, or in cavities within the wall of the body 101. When the thermal tomography elements are disposed on an interior surface of the body 101, the elements can be in direct fluid contact with the propellant, enabling the use of techniques such as electrical resistance tomography. In such embodiments, the thermal tomography elements should be formed from materials which are chemically compatible with the propellant.

Figure 3:
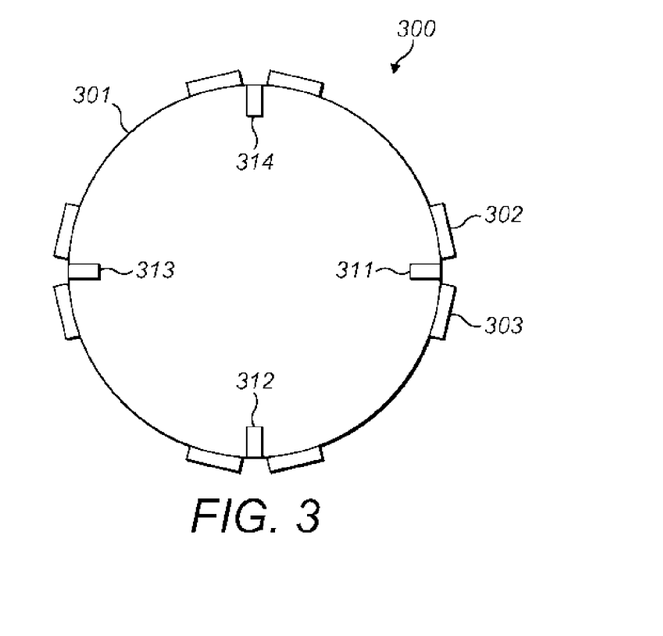
FIG. 3 illustrates an array of tomography elements disposed around the body of a propellant tank, according to an embodiment of the present invention.

Referring now to FIG. 3, an array of thermal tomography elements disposed around the body of a propellant tank is illustrated, according to an embodiment of the present invention. FIG. 3 shows a cross-section through a propellant tank assembly 300 comprising a body 301 and four guide vanes 311, 312, 313, 314 inside the body 301. The thermal tomography elements 302, 303 are disposed on an exterior surface of the body 301 in proximity to each of the guide vanes 311, 312, 313, 314. In the present embodiment the thermal tomography elements are arranged in strips, similar to the embodiment of FIGS. 1 and 2, with two strips of sensors 302, 303 disposed in proximity to each guide vane 311.

When a propellant tank assembly includes one or more PMDs, for example guide vanes as shown in FIG. 3, the propellant distribution will be concentrated around the guide vanes, particularly when the tank is approaching depletion. Providing thermal tomography elements which are disposed in proximity to the PMDs has the advantage that the resolution obtainable by the tomography array is enhanced in critical areas, where the greatest variation in propellant surface profile exists.

Figure 4:
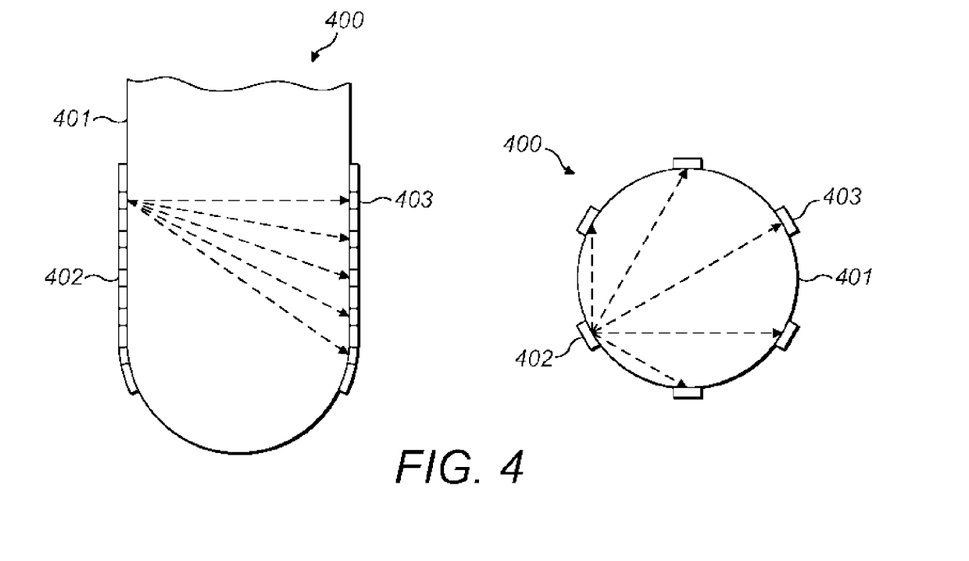
FIG. 4 illustrates the collection of tomography data from an array of tomography elements disposed around the body of a propellant tank, according to an embodiment of the present invention.

Referring now to FIG. 4, the collection of tomography data from an array of thermal tomography elements disposed around the body of a propellant tank is illustrated, according to an embodiment of the present invention. The left-hand diagram in FIG. 4 illustrates a vertical cross-section through the propellant tank assembly 400 and the right-hand diagram illustrates a horizontal cross-section through the propellant tank assembly 400, when the propellant tank assembly 400 is in an upright position.

As shown in FIG. 4, the propellant tank assembly 400 of the present embodiment comprises an array of thermal tomography elements arranged in six vertical strips 402, 403 around the propellant tank body 401, each strip including five tomography elements. These numbers are merely exemplary, and in other embodiments different numbers of thermal tomography elements may be used and/or a different geometry can be used for the tomography array. Each thermal tomography element can be either an emitter or a receiver, or can be both an emitter and receiver.

In the example shown in FIG. 4, an emitter in one strip 402 of thermal tomography elements emits a thermal signal by local heating or cooling, which is detected by receivers in another strip 403. This enables the attenuation of the thermal signal to be determined along different paths through the body 401. The tomography array of no emitters and receivers can measure the attenuation of the thermal signal between different points around the body 401 of the propellant tank assembly 400, and the attenuation depends upon the composition through which it passes. The tomography array can be used to obtain tomography data which includes information about the attenuation between different points around the body 401. A tomography algorithm can be used to reconstruct a 3-dimensional map of the propellant tank contents from the obtained tomography data.

By enabling the distribution of propellant within the propellant tank assembly to be determined, embodiments of the present invention offer several advantages over conventional propellant gauging methods. For example, the mass of propellant remaining in the propellant tank body can be determined by calculating the volume of propellant from the obtained 3-dimensional map of the propellant tank contents, and multiplying the volume of propellant by a known density of the propellant. This can provide a more accurate measure of the mass of propellant than conventional methods.

Another advantage of detecting the distribution of propellant can be validation of a propellant tank design, by confirming that the propellant is distributed in the intended locations within the propellant tank body. Also, embodiments of the present invention can provide visualisation of static residuals towards the end-of-life, which is propellant that cannot be removed from the tank surfaces.

Yet another advantage offered by embodiments of the present invention is the ability to provide real-time monitoring of the propellant distribution (hiring spacecraft manoeuvres. In particular, for long-duration spacecraft manoeuvres the propellant management devices (PMDs) within the propellant tank body may become depleted or unwetted. When conventional propellant gauging methods are used, it is normal practice to enforce a significant safety margin on manoeuvre duration to allow for uncertainties in propellant distribution. However, by using tomography to detect the propellant distribution, embodiments of the present invention can provide real-time confirmation that the PMDs remain wetted. This can allow extended manoeuvre durations without having to incorporate such large safety margins, thereby saving time in spacecraft operation schedules.

Figure 5:
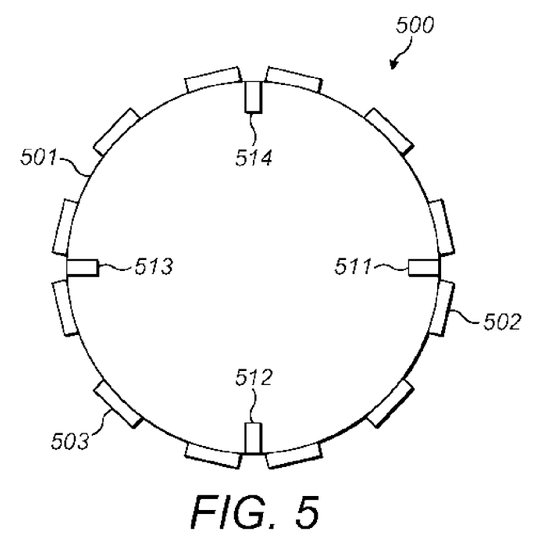
FIG. 5 illustrates an array of thermal tomography elements disposed around the body no of a propellant tank, according to an embodiment of the present invention.

Referring now to FIG. 5, an array of thermal tomography elements disposed around a no propellant tank body is illustrated, according to an embodiment of the present invention. Like FIG. 3, FIG. 5 shows a cross-section through a propellant tank assembly 500 comprising a body 501 and four guide vanes 511, 512, 513, 514 inside the body 501. The thermal tomography elements 502, 503 are disposed on an exterior surface of the body 501 in proximity to each of the guide vanes 511, 512, 513, 514. In the present embodiment the thermal tomography elements 502, 503 are arranged in strips, similar to the embodiment of FIGS. 1 to 4, with two strips disposed in proximity to each of the guide vanes 511, 512, 513, 514.

The thermal tomography elements include a plurality of coolers 502 disposed in proximity to the PMDs 511, 512, 513, 514, which in the present embodiment are guide vanes. The thermal tomography elements also include a plurality of heaters 503 disposed around the body 501 at locations remote from the PMDs 511, 512, 513, 514. That is, the plurality of coolers 502 are located closer to the PMDs than the plurality of heaters 503. The plurality of coolers could be peltier-driven coolers. The heaters and coolers can both be referred to as temperature-control elements.

In the present embodiment, the plurality of thermal tomography elements 502, 503 can be controlled to redistribute propellant to a desired distribution in which propellant is concentrated at the PMDs 511, 512, 513, 514.

Specifically, the plurality of thermal tomography elements 502, 503 can be controlled by cooling the coolers 502 located near to the PMDs 511, 512, 513, 514 while heating the heaters 503 located further from the PMDs 511, 512, 513, 514. This lowers the temperature of the PMDs relative to other regions in the propellant tank assembly 500, causing any remaining propellant to condense onto the PMDs 511, 512, 513, 514 and increasing the amount of propellant which can be extracted as the tank becomes empty.

In other embodiments a plurality of thermal tomography elements may only include a plurality of heaters or may only include a plurality of coolers. In such embodiments the tomography elements can still be arranged so that a plurality of first thermal tomography elements 502 are disposed in proximity to one or more PMDs and a plurality of second thermal tomography elements 503 are disposed at locations remote from the PMDs, similar to the arrangement shown in FIG. 5. That is, the first thermal tomography elements 502 can be located closer to the PMDs than the second thermal tomography elements 503. When both the first and second thermal tomography elements 502, 503 are heaters, the thermal tomography elements can be controlled to redistribute the propellant to be closer to the PMDs by only heating the second tomography elements 503, or by heating the second tomography elements 503 to a higher temperature than the first tomography elements 502. On the other hand, when both the first and second thermal tomography elements 502, 503 are coolers, the thermal tomography elements can be controlled to redistribute the propellant to be closer to the PMDs by only cooling the first tomography elements 502, or by cooling the first tomography elements 502 to a lower temperature than the second tomography elements 503. Both of these control methods can generate thermal gradients within the propellant tank assembly 500 which will cause propellant to condense onto the PMDs, by lowering the temperature near the PMDs relative to other regions in the propellant tank assembly too.

Figure 6:
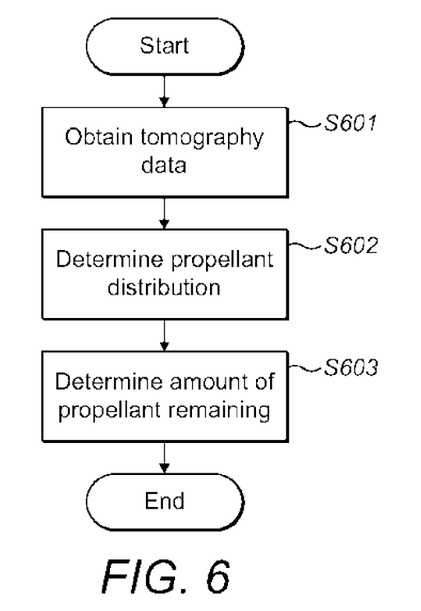
FIG. 6 is a flowchart showing a method of determining an amount of propellant remaining in a propellant tank, according to an embodiment of the present invention.

FIG. 6 is a flowchart showing a method of determining an amount of propellant remaining in a propellant tank, according to an embodiment of the present invention. In the first step S601, tomography data is obtained from a plurality of thermal tomography elements disposed on an exterior surface of a body of a spacecraft propellant tank, for example a propellant tank assembly as shown in any of FIGS. 1 to 5.

Then, in step S602, the distribution of propellant inside the propellant tank is determined based on the obtained tomography data. Here, the step S602 of determining the propellant distribution can be carried out by processing the tomography data onboard the spacecraft using a tomography algorithm. Alternatively, the raw tomography data can be transmitted from the spacecraft to another apparatus, for example a ground-based tomography data analysis module, for processing.

Once the propellant distribution has been determined, the amount of propellant remaining can optionally be determined in step S603 based on the determined distribution and a known density of the propellant. Specifically, the volume of propellant can be calculated from the determined distribution and this can be multiplied by the propellant density to give the mass of remaining propellant.

Figure 7:
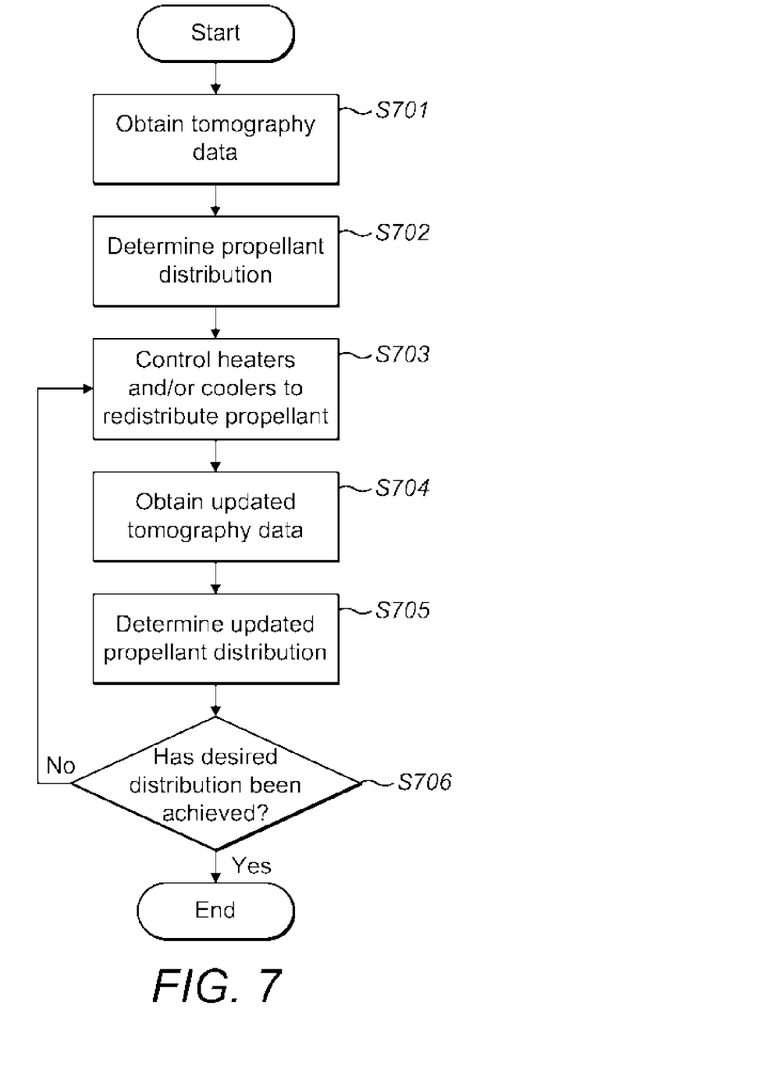
FIG. 7 is a flowchart showing a method of using thermal tomography elements to control propellant distribution in a propellant tank, according to an embodiment of the present invention.

FIG. 7 is a flowchart showing a method of using thermal tomography elements to redistribute propellant in a propellant tank body, according to an embodiment of the present invention. The method can be implemented using any propellant tank assembly which includes a plurality of thermal tomography elements. The method takes advantage of a plurality of heaters and/or a plurality of coolers included in the thermal tomography elements as emitters, by using the heaters to locally heat regions of the propellant tank assembly and/or by using the coolers to locally cool regions of the propellant tank assembly, in order to redistribute propellant.

First, in step S701, tomography data is obtained from the plurality of thermal tomography elements, and in step S702 the distribution of propellant inside the propellant tank is determined based on the obtained tomography data. These steps can be similar to steps S601 and S602 in FIG. 6. Then, in step S703, the heaters and/or coolers are controlled to redistribute the propellant inside the propellant tank body by heating and/or cooling the propellant.

To control the heaters and/or coolers to redistribute the propellant, various approaches are possible, as described above with reference to FIG. 5. In the present embodiment, a plurality of heaters are controlled by comparing the distribution determined in step S702 to a desired distribution of propellant, to identify one or more first regions within the propellant tank body having a higher concentration of propellant in the determined distribution than in the desired distribution. Then the plurality of heaters are controlled to heat the identified one or more first regions, by activating the heaters located closest to the identified one or more first regions. Instead of, or as well as, controlling a plurality of heaters, a plurality of coolers can be controlled by comparing the distribution determined in step S702 to the desired distribution of propellant, to identify one or more second regions within the propellant tank body having a lower concentration of propellant in the determined distribution than in the desired distribution. Then the plurality of coolers are controlled to cool the identified one or more second regions, by activating the coolers located closest to the identified one or more second regions.

In other embodiments alternative control methods could be used. For example, a plurality of predetermined heater and/or cooler control schemes could be stored, each corresponding to one of a plurality of different predetermined distributions. One of the plurality of predetermined distributions closest to the actual distribution, as determined in step S702, can be selected, and the predetermined heater and/or cooler control scheme associated with the selected predetermined distribution can be used to control the heaters and/or coolers. The predetermined heater and/or cooler control scheme can, for example, identify which ones of the heaters and/or coolers are to be switched on, and to what temperature each heater or cooler should be set.

After controlling the heaters and/or coolers, updated tomography data is obtained in step S704 and an updated propellant distribution is determined in step S705. These steps can be similar to steps S701 and S702. Next, in step S706 the updated propellant distribution is compared to the desired distribution. If the updated propellant distribution matches the desired distribution, either exactly or within a predetermined acceptable margin of error, the method ends. On the other hand, if it is determined that the desired distribution has not been achieved, the method returns to step S703 and selectively controls the heaters again to redistribute the propellant further.

Here, the desired distribution can be a distribution in which the propellant is distribution in the intended locations, for example on and around any PMDs included inside the propellant tank body. Also, although in the present embodiment it is checked whether the desired distribution has been achieved, in other embodiments it could be assumed that the selective heating of the propellant tank has had the desired effect, and steps S704 to S706 could be omitted.

Figure 8:
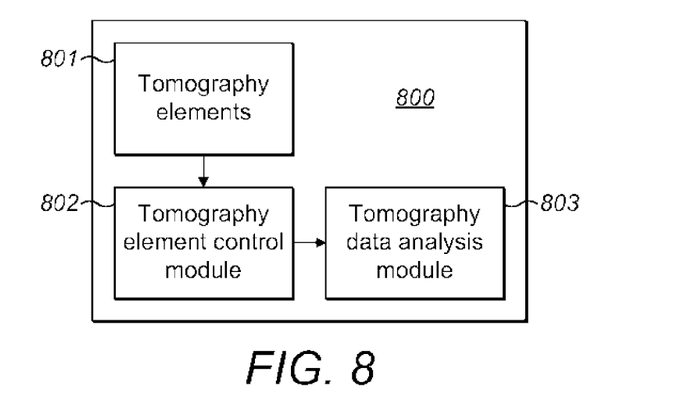
FIG. 8 illustrates a system for determining a propellant distribution in a propellant tank assembly, according to an embodiment of the present invention.

Referring now to FIG. 8, a system for determining a propellant distribution in a propellant tank assembly is illustrated, according to an embodiment of the present invention. The system comprises a propellant tank assembly including a plurality of thermal tomography elements 801, for example a propellant tank assembly as shown in any one of FIGS. 1 to 5. The system further comprises a tomography element control module 802 arranged to control the plurality of thermal tomography elements 801 to obtain tomography data, and a tomography data analysis module 803 arranged to receive the obtained tomography data and to determine a distribution of the propellant inside the propellant tank based on the obtained tomography data. The propellant tank assembly including the thermal tomography elements 801, the tomography element control module 802 and the tomography data analysis module 803 are included onboard the same spacecraft 800. This arrangement may be preferred when, for example, the spacecraft is a manned spacecraft and the crew require access to the processed tomography data, i.e. the determined 3-dimensional map showing propellant distribution within the propellant tank.

Figure 9:
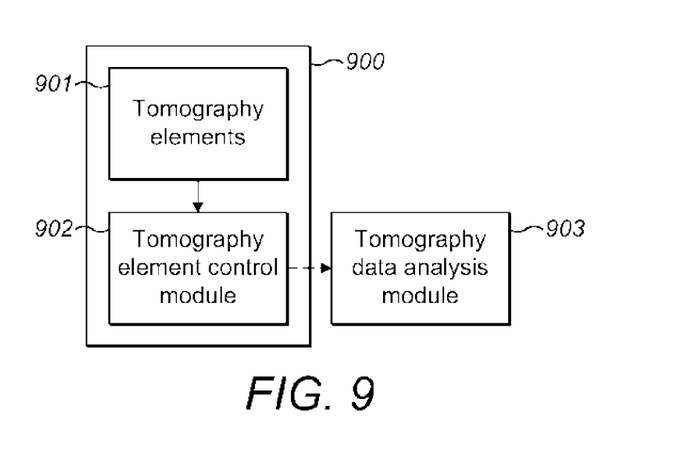
FIG. 9 illustrates a system for determining a propellant distribution in a propellant tank assembly, according to an embodiment of the present invention.

Referring now to FIG. g, a system for determining a propellant distribution in a propellant tank assembly is illustrated, according to an embodiment of the present invention. The system is similar to that of FIG. 8, except that in the present embodiment the propellant tank assembly including the thermal tomography elements 901, and the tomography element control module 902, are included onboard a spacecraft 900, whilst the tomography data analysis module 903 is a ground-based module arranged to receive the obtained tomography data from the spacecraft 900.

In the systems of both FIGS. 8 and 9, the tomography element control module 802, 902 can be further arranged to control the plurality of heaters and/or coolers to redistribute the propellant inside the propellant tank body by heating the propellant, using methods such as the ones described above with reference to FIGS. 5 and 7.

It will be understood that the present invention can be applied to any type of propellant tank assembly, and embodiments of the present invention are not limited to the propellant tank design shown in FIGS. 1 to 5.

Whilst certain embodiments of the present invention have been described above, it will be understood that many variations and modifications are possible without departing from the scope of the invention as defined in the claims.

The invention claimed is:

1. A system for controlling a distribution of propellant in a propellant tank assembly for a spacecraft, the system comprising:
   a body for containing the propellant;
   a plurality of thermal tomography elements, including a plurality of temperature-control elements and a plurality of temperature sensors, disposed around the body for detecting the distribution of the propellant inside the body; and
   a tomography element control module arranged to control the plurality of temperature-control elements to redistribute the propellant inside the body by heating and/or cooling the propellant, and arranged to control the plurality of thermal tomography elements to obtain tomography data; and
   a tomography data analysis module arranged to receive the tomography data and to determine the distribution of the propellant inside the body based on the tomography data.

2. The system of claim 1, further comprising:
   a propellant outlet; and
   a propellant management device inside the body, arranged to supply the propellant to the propellant outlet.

3. The system of claim 2, wherein the plurality of temperature sensors are disposed in proximity to the propellant management device.

4. The system of claim 2, wherein the plurality of temperature-control elements include a plurality of coolers disposed in proximity to the propellant management device.

5. The system of claim 2, wherein the plurality of temperature-control elements include a plurality of heaters disposed away from the propellant management device.

6. The system of claim 2, wherein the propellant management device comprises one or more vanes.

7. The system of claim 1, wherein the plurality of thermal tomography elements are disposed on an exterior surface of the body.

8. The system of claim 1, wherein the propellant tank assembly, the tomography element control module and the tomography data analysis module are included onboard the spacecraft.

9. The system of claim 1, wherein the propellant tank assembly and the tomography element control module are included onboard the spacecraft, and the tomography data analysis module is a ground-based module arranged to receive the obtained tomography data from the spacecraft.

10. A method of controlling a distribution of propellant in a propellant tank assembly for a spacecraft, the propellant tank assembly comprising a body for containing the propellant and a plurality of thermal tomography elements, including a plurality of temperature-control elements and a plurality of temperature sensors, disposed around the body for detecting the distribution of the propellant inside the body, the method comprising:
   controlling the plurality of thermal tomography elements to obtain tomography data;
   determining a determined distribution of the propellant inside the body based on the tomography data; and
   controlling the plurality of temperature-control elements to redistribute the propellant inside the body by heating and/or cooling the propellant.

11. The method of claim 10, wherein the controlling the plurality of thermal tomography elements and the determining the determined distribution of the propellant inside the body are performed prior to controlling the plurality of temperature-control elements to redistribute the propellant.

12. The method of claim 11, further comprising:
   determining an amount of the propellant remaining in the propellant tank based on the determined distribution and a known density of the propellant.

13. The method of claim 10, wherein controlling the plurality of temperature-control elements to redistribute the propellant comprises:
   comparing the determined distribution to a desired distribution of propellant to identify one or more first regions within the propellant tank body having a higher concentration of propellant in the determined distribution than in the desired distribution; and
   controlling the plurality of temperature-control elements to heat the identified one or more first regions, and/or
   wherein controlling the plurality of temperature-control elements to redistribute the propellant comprises:
   comparing the determined distribution to the desired distribution of propellant to identify one or more second regions within the propellant tank body having a lower concentration of propellant in the determined distribution than in the desired distribution; and controlling the plurality of temperature-control elements to cool the identified one or more second regions.

14. The method of claim 10, further comprising:
obtaining updated tomography data from the plurality of thermal tomography elements, after controlling the plurality of temperature-control elements to redistribute the propellant inside the body; and
determining an updated distribution of the propellant inside the body based on the obtained updated tomography data.

* * * * *